United States Patent
Kim

(10) Patent No.: US 9,041,820 B2
(45) Date of Patent: May 26, 2015

(54) CAMERA MODULE

(75) Inventor: Minsoo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 25 days.

(21) Appl. No.: 14/114,716

(22) PCT Filed: Apr. 26, 2012

(86) PCT No.: PCT/KR2012/003253
§ 371 (c)(1),
(2), (4) Date: Oct. 29, 2013

(87) PCT Pub. No.: WO2012/148196
PCT Pub. Date: Nov. 1, 2012

(65) Prior Publication Data
US 2014/0071304 A1    Mar. 13, 2014

(30) Foreign Application Priority Data

Apr. 29, 2011   (KR) .................. 10-2011-0040636

(51) Int. Cl.
*H04N 5/225*   (2006.01)
*H04N 5/232*   (2006.01)
*G02B 7/08*    (2006.01)
*G02B 27/64*   (2006.01)

(52) U.S. Cl.
CPC ........... *H04N 5/2253* (2013.01); *H04N 5/2257* (2013.01); *H04N 5/23287* (2013.01); *G02B 7/08* (2013.01); *G02B 27/646* (2013.01); *G03B 2205/0069* (2013.01)

(58) Field of Classification Search
CPC ..................................................... H04N 5/2257
USPC ............................................ 348/208.99, 335
See application file for complete search history.

(56) References Cited

U.S. PATENT DOCUMENTS

| | | |
|---|---|---|
| 2006/0197862 A1* | 9/2006 | Lung .............................. 348/335 |
| 2007/0152147 A1 | 7/2007 | Webster |
| 2009/0051776 A1 | 2/2009 | Wernersson |

FOREIGN PATENT DOCUMENTS

JP    2006-38891 A    2/2006

* cited by examiner

*Primary Examiner* — Joel Fosselman
(74) *Attorney, Agent, or Firm* — Birch, Stewart, Kolasch & Birch, LLP

(57) ABSTRACT

A camera module includes a lens part, an auto focusing (AF) module, an optical image stabilizer (OIS) module, a case and a flexible circuit board. The AF module moves the lens unit in the direction of an optical axis. The OIS module is mounted around a circumference of the AF module and moves the AF module in a horizontal direction. The case accommodates the lens unit, the AF module and the OIS module. The flexible circuit board is connected to a bottom surface of the AF module and applies an electrical signal to the AF module.

20 Claims, 5 Drawing Sheets

CAMERA MODULE

TECHNICAL FIELD

The present invention relates to a camera module, and more particularly, to a camera module in which an optical image stabilizer (OIS) module is built using a module tilt method, so that the entire apparatus can be slimmed.

BACKGROUND ART

An optical image stabilizer (OIS) module is an image stabilization module that performs a function of correcting a tremor, etc. when photographing is performed by a camera. As the spread of a smart phone, a tablet PC, etc. has recently been extended, the OIS module built in a conventional digital camera, etc. is also built in a camera module of a portable terminal.

When the OIS module is built in the camera module, it is most important to have minimum influence on the elasticity of an actuator (such as spring) shaking an auto focusing (AF) module in the direction of X- and Y-axes. By doing so, tremor correction can be performed suitable for a change in the angular velocity of a gyro sensor mounted in a cellular phone, etc.

The OIS module is generally divided into a lens shift method of moving a lens in the horizontal direction, a sensor shift method of moving an image sensor in the horizontal direction, a module tilt method of the AF module in the horizontal direction, etc. according to an object to be moved in the direction of the X- and Y-axes.

The lens shift method is a method of additionally shaking a lens unit moving in the direction of a Z-axis by an AF module in the direction of the X- and Y-axes, and a space in which the lens unit can be shaken in the direction of the X- and Y-axes is required in the inside of the AF module. Since the lens shift method can be configured by connecting a flexible printed circuit board (FPCB) to the AF module, there is no serious limitation in connecting a circuit board to the AF module. However, the lens unit is shaken in the horizontal direction in the inside of the AF module, and therefore, the optical axis of an optical system may be shaken.

On the other hand, since the module tilt method is a method of shaking the AF module itself in the direction of the X- and Y-axes, the optical axis of the optical system is maintained. Thus, when the tremor correction is performed, the module tilt method shows superior performance as compared with other methods.

However, in the module tilt method, the entire AF module should be shaken in the direction of the X- and Y-axes, and hence the AF module should be floated in a housing of the camera module. Accordingly, it is difficult to connect the FPCB to the AF module. This is because the conventional simple connection of the FPCB to the AF module has influence on the elasticity of an OIS actuator in the process in which the AF module moves in the horizontal direction.

DISCLOSURE OF INVENTION

Technical Problem

The present invention is conceived to solve the aforementioned problems. Accordingly, an object of the present invention is to provide a camera module having a new structure, which enables an optical image stabilizer (OIS) module to be built in the camera module of a smart phone, tablet PC, etc. using a module tilt method by characterizing the structure of a flexible printed circuit board (FPCB) connected to an auto focusing (AF) module.

Solution to Problem

According to an aspect of the present invention, there is provided a camera module including: a lens unit; an auto focusing (AF) module configured to move the lens unit in the direction of an optical axis; an optical image stabilizer (OIS) module configured to be mounted around a circumference of the AF module and move the AF module in a horizontal direction; a case configured to accommodate the lens unit, the AF module and the OIS module; and a flexible circuit board configured to be connected to a bottom surface of the AF module and apply an electrical signal to the AF module, wherein the flexible circuit board includes a mounting portion mounted on a bottom surface of the case, a cut-away portion, a connecting portion extended to an inside of the case from one side of the mounting portion so as to be connected to the AF module, and an extending portion extended to an outside of the case from the other side of the mounting portion.

The cut-away portion may be cut away along the circumference of the AF module in an inside of the mounting portion.

A bump pad may be formed in the AF module, and a connection pad connected to the bump pad may be patterned in the connecting portion.

A circuit pattern connected to the connection pad may be formed to branch off to mounting portions respectively positioned at both sides of the connecting portion.

A first coupling projection may be formed on a sidewall of the case contacted by the extending portion of the flexible circuit board, and a first coupling hole having the first coupling projection inserted thereinto may be formed in the extending portion.

A second coupling projection may be formed at one bottom side of the case, and a second coupling hole having the second coupling projection inserted thereinto may be formed in one of the mounting portions of the flexible circuit board, which is adjacent to the extending portion.

The cut-away portion may be formed in a '⌐' shape.

A guide projection may be formed on the circumference of the AF module, and a guide groove accommodating the guide projection may be formed in the inside of the case so as to control the horizontal movement of the AF module.

The flexible circuit board may be formed as a rigid-flexible PCB (RFPCB).

The connecting portion of the flexible circuit board may be formed with a rigid PCB, and the other components of the flexible circuit board may be formed with a flexible PCB.

An aligning hole may be formed in an edge portion of the rigid PCB.

The flexible circuit board may have a structure in which the rigid PCB forming the connecting portion and the flexible PCB electrically connected to the rigid PCB and having the other components of the flexible circuit board are attached to each other.

A bending portion may be formed at one side of the extending portion, and the bending portion may be assembled to an outer wall of the case.

The OIS module may include a housing accommodating the AF module, a coil unit mounted to an outside of the housing, a magnet unit formed in an inside of the housing, and an actuator elastically moving the AF module in the horizontal direction.

A mounting projection may be formed on an outer wall of the housing for accommodating the coil unit.

The actuator may be a spring elastically supporting the circumference of the AF module.

The actuator may perform an operation of allowing the AF module to be shaken by an electromagnetic force generated by the coil unit and the magnet unit.

A guide projection may be formed on the circumference of the AF module, and a guide groove accommodating the guide projection may be formed in the inside of the case so as to control the horizontal movement of the AF module.

An image sensor may be mounted to the bottom surface of the AF module.

The image sensor may be a charged coupled device (CCD) or complementary metal oxide semiconductor (CMOS) sensor.

Advantageous Effects of Invention

According to the present invention, a flexible circuit board is configured to includes a mounting portion mounted on four surfaces of a bottom of a case, a connecting portion extended to an inside of the case from one side of the mounting portion, an extending portion extended to an outside of a case from the other side of the mounting portion, and a cut-away portion formed between the mounting portion and the connecting portion, so that it is possible to minimize that when an auto focusing (AF) module is shaken with respect to the case, the deformation of the flexible circuit board connected to the AF module has influence on the elasticity of an actuator of an optical image stabilizer (OIS) module. Accordingly, the OIS module is built in the camera module for a potable terminal such as a smart phone or tablet PC using a module tilt method, so that the entire apparatus having the camera module can be designed to be slim.

MODE FOR THE INVENTION

Figure 1:
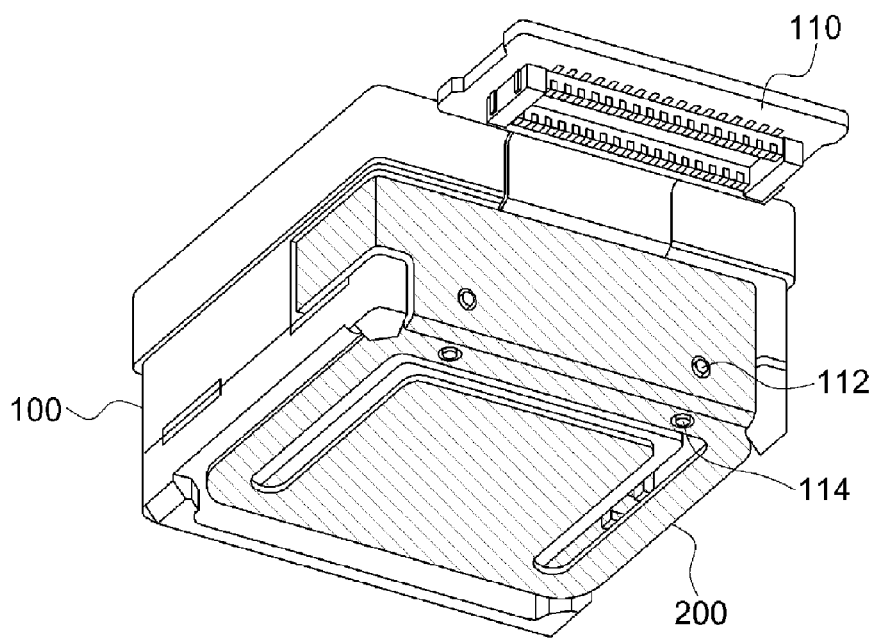
FIG. 1 is a bottom perspective view of a camera module according to an embodiment of the present invention.

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

In the drawings, the thickness of layers, films and regions are exaggerated for clarity. Like numerals refer to like elements throughout.

The present invention relates to a camera module in which an optical image stabilizer (OIS) module is built in a camera module for a portable terminal such as a smart phone or tablet PC, using a module tilt method. Here, the "module tilt" method refers to a method in which the OIS module shakes an entire auto focusing (AF) module in the direction of X- and Y-axes with respect to a case of the camera module.

The camera module of the present invention is an invention characterized by a structure in which when the OIS module is built in the camera module using the module tilt method, an AF module is floated with respect to a case and in this case, a flexible circuit board is connected to the AF module. Hereinafter, the connection structure of the flexible circuit board will be mainly described. The configurations of the AF module and the OIS module are obvious to those skilled in the art, and therefore, their detailed descriptions will be omitted.

Figure 2:
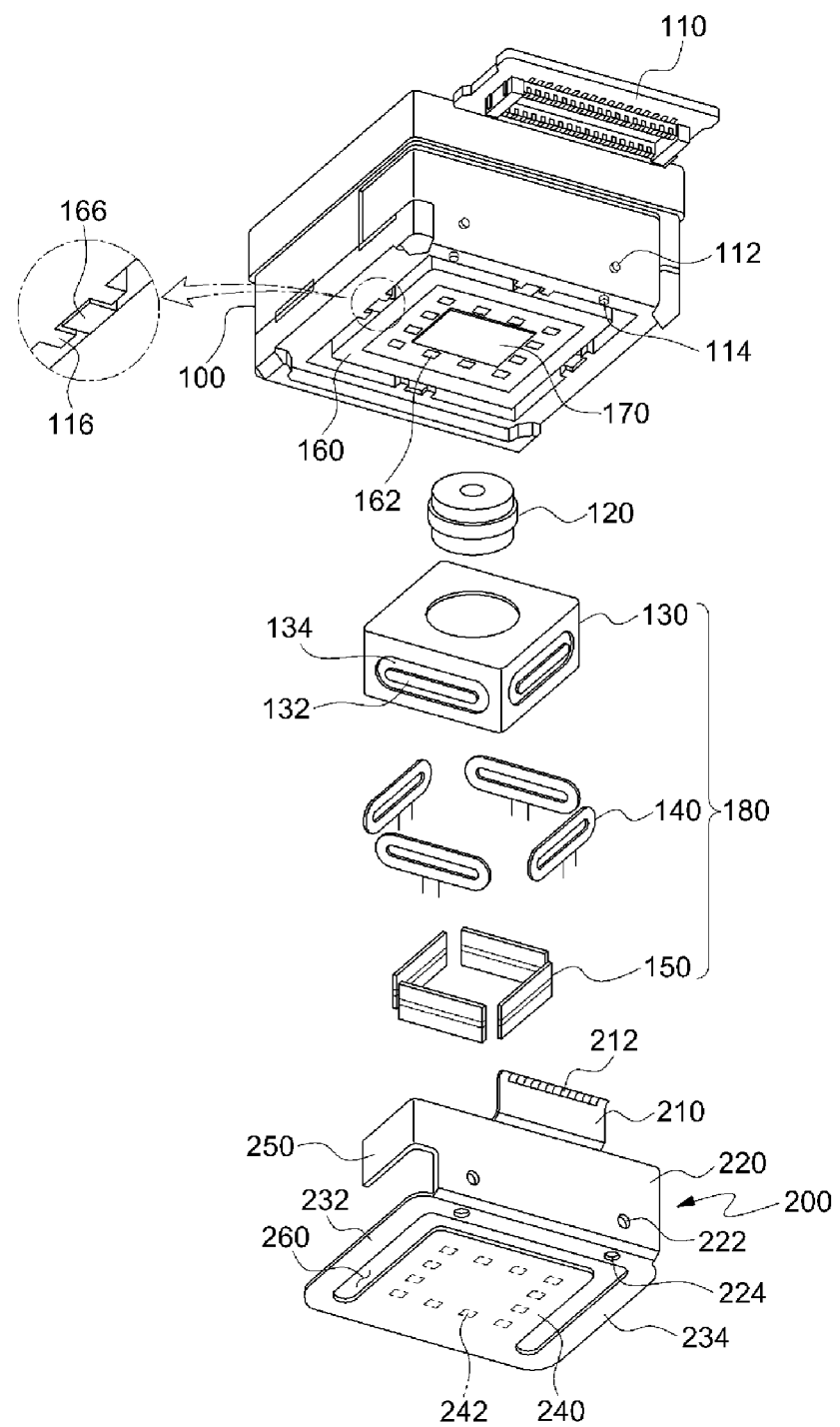
FIG. 2 is an exploded perspective view showing a state in which some components are disassembled in the camera module of FIG. 1.

FIG. 1 is a bottom perspective view of a camera module according to an embodiment of the present invention. FIG. 2 is an exploded perspective view showing a state in which some components are disassembled in the camera module of FIG. 1.

Referring to FIG. 1, the camera module has a terminal block 110 is formed at one external side of a case 100. One side of a flexible circuit board 200 hatched in FIG. 1 is connected to the terminal block 110, and the other side of the flexible circuit board 200 is connected to an AF module 160 mounted in the case 100.

Referring to FIG. 2, a lens unit 120 composed of a plurality of lenses is mounted and inserted into the case 100. The lens unit 120 is mounted to pass through the AF module 160 shown in the inside of the case 100. The lens unit 120 is moved in the direction of an optical axis by the AF module 160.

An OIS module 180, as exploded in FIG. 2, is mounted around the circumference of the AF module 160. The OIS module 180 includes a housing 130 accommodating the AF module 160, a coil unit 140 mounted to an outside of the housing 130, a magnet unit 150 formed at an inside of the housing 130, and an actuator (not shown) elastically moving the AF module 160 in the horizontal direction.

The housing 130 is provided in the shape of a hollow box having an opening 132 formed at the top thereof so that the lens unit 120 and the AF module 160 can be accommodated in the inside of the housing 130. A mounting projection 134 is formed on an outer wall of the housing 130 for accommodating the coil unit 140. If current is applied to the coil unit 140, the coil unit 140 generates an electromagnetic force together with the magnet unit 150.

Although not shown in this figure, the actuator is, for example, an elastic spring that elastically supports a circumferential portion of the AF module 160. Thus, the actuator composed of the spring operates the AF module 160 to be shaken in the horizontal direction by the electromagnetic force generated by the coil unit 140 and the magnet unit 150, thereby correcting a tremor, etc.

In order to stabilize the horizontal movement of the AF module 160, as shown in the enlarged portion of FIG. 2, guide projections 166 are respectively formed at four surfaces on the circumference of the AF module 160, and guide grooves 116 respectively accommodating the guide projections 166 are formed in the inside of the case so as to control the horizontal movement of the AF module 160.

An image sensor 170 is mounted at a bottom portion of the AF module 160. The image sensor 170 is a charge coupled device (CCD) sensor, a complementary metal oxide semiconductor (CMOS) sensor, etc. The image sensor 170 forms an image focused by the lens unit 120, and the image sensor 170, the lens unit 150, an infrared filter (not shown), etc. are arranged along the optical axis.

Referring to FIG. 2, in the present invention, the flexible circuit board 200 for applying an electrical signal to the AF module 160 has a characterized structure. The flexible circuit board 200 includes a mounting portion 232 and 234 mounted on the four surfaces of the bottom surface of the case 100, an cut-away portion 260 cut away along a circumference of the AF module at the inside of the mounting portion 232 and 234, a connecting portion 240 extended to the inside of the case 100 from one side surface of the mounting portion 232 and 234 so as to be connected to the AF module 160, and an extending portion 220 extended to the outside of the case 100 from the other side surface of the mounting portion 232 and 234.

A connection pin 212 is formed at an end of a terminal piece 210 protruded toward the terminal block 110. The connection pin 212 is connected to the terminal block 110 so as to supply the electrical signal applied to the AF module 160. The embodiment shown in this figure is merely one embodiment of the terminal piece 210 and the connection pin 212, and the shape of the terminal piece 210 and the connection pin 212 may be modified in the shape of various connection terminals.

Figure 3:
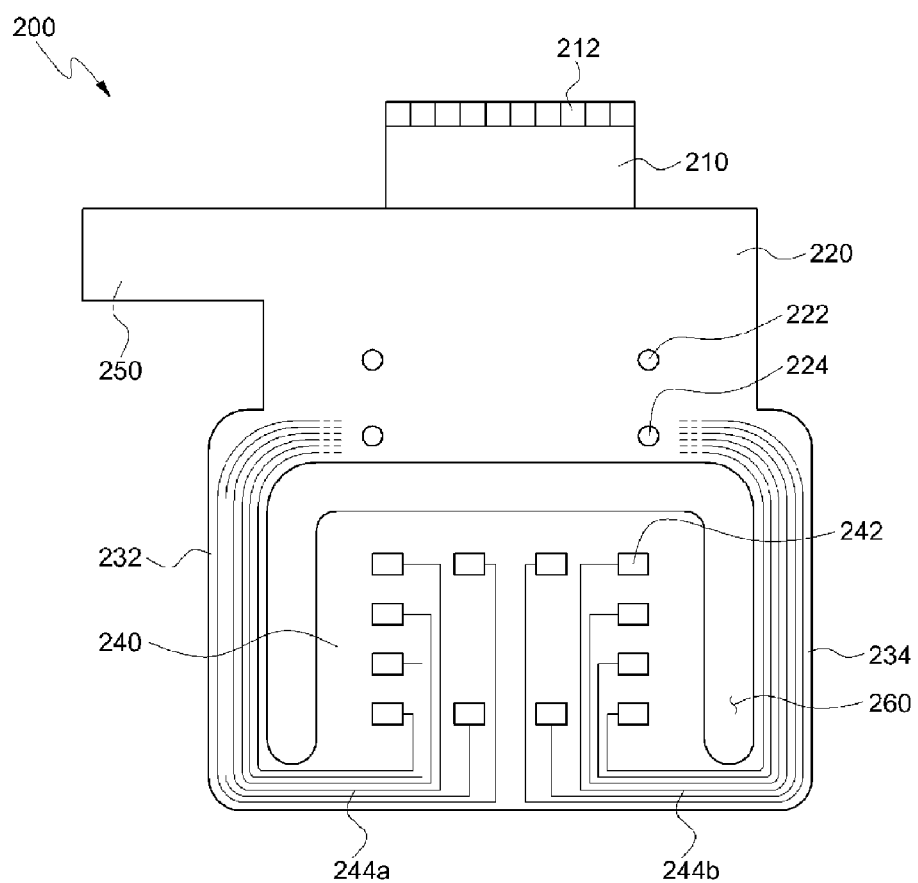
FIG. 3 is a development view showing an embodiment of a flexible circuit board.

FIG. 3 is a development view showing an embodiment of the flexible circuit board. Hereinafter, the structure of the flexible circuit board and the horizontal operation of the AF module will be described in detail with reference to FIGS. 2 and 3.

Referring to FIG. 3, the cut-away portion 260 is formed in a shape in which the inside of the mounting portion 232 and 234 is cut away in a "⊓" shape, and accordingly, the connecting portion 240 has an island shape in which only one side of the connecting portion 240 is connected to the mounting portion 232 and 234. If the connecting portion 240 is connected at one side of the mounting portion 232 and 234, the extending portion 220 is extended to the outside of the case 100 at the other side opposite to the one side of the connecting portion 240.

Connection pads 242 respectively connected to bump pads 162 are formed to be patterned in the connecting portion 240. The bump pad 162 and the connection pad 242 are connected to each other using an anisotropic conductive film (ACF), hot bar or surface mounting technology (SMT) method. It will be apparent that the bump pad 162 and the connection pad 242 are connected to each other using another connecting method.

Here, as the connecting portion 240 has the island shape with respect to the mounting portion 232 and 234, it is possible to minimize that other components of the flexible circuit board 200 have influence on the elasticity of the OIS module 180 when the connecting portion 240 is shaken together with the AF module 160 in the direction of the X- and Y-axes. This can minimize that the operation of the AF module 160 is influenced when tremor correction is performed suitable for a change in the angular velocity of a gyro sensor.

In the embodiment shown in this figure, both two portions to which the connecting portion 240 and the extending portion 220 are not connected among the four surfaces of the mounting portion 232 and 234 are referred to as first and second mounting portions 232 and 234, respectively.

Referring to FIG. 3, circuit patterns connected to the connection pads 242 of the connecting portion 240 are formed to branch off to the first and second mounting portions 232 and 234. As shown in this figure, a first circuit pattern 244a is formed on the first mounting portion 232 and a second circuit pattern 244b is formed on the second mounting portion 234. If the circuit patterns are formed to branch off, the widths of the first and second mounting portions 232 and 234 contacting the bottom surface of the case 100 can be designed to be narrow, and a large amount of elasticity can be imparted to the operation of the connecting portion 240.

In order to perform a flexible operation of the connecting portion 240, the mounting portion 232 and 234 and the extending portion 220 in the configuration of the flexible circuit board 200 are not joined or electrically connected to the case 100 of the camera module. On the other hand, the mounting portion 232 and 234 and the extending portion 220 may require a means for maintaining their positions with respect to the case 100.

Referring to FIGS. 2 and 3, a bending portion 250 is formed in the direction of one side of the extending portion 220. The bending portion 250 is assembled to an outer wall of the case 100, and enables the extending portion 220 to maintain its position while having a certain degree of elasticity with respect to the movement of the connecting portion 240.

Referring to FIG. 2, a first coupling projection 112 is formed on a sidewall of the case 100 contacted by the extending portion 220 of the flexible circuit board 200, and a first coupling hole 222 having the first coupling projection inserted thereinto is formed in the extending portion 220.

A second coupling projection 114 is formed at one bottom side of the case 100, and a second coupling hole 224 having the second coupling projection 114 inserted thereinto is formed in one of the first and second mounting portions 232 and 234 of the flexible circuit board 200, which is adjacent to the extending portion 220.

Thus, in the process of assembling the flexible circuit board 200, the first and second coupling holes 222 and 224 of the flexible circuit board 200 are respectively coupled to the first and second coupling projections 112 and 114 of the case, so that the flexible circuit board 200 can be easily aligned in the assembling process. Further, when the connecting portion 240 is shaken with the AF module 160, it is possible to allow the other components of the flexible circuit board 200 to maintain their positions while having a certain degree of elasticity.

In this case, the second coupling projection 114 and the second coupling hole 224 are positioned at the opposite side of the portion at which the connecting portion 240 is connected, so that it is possible to have minimum influence on the movement of the connecting portion 240.

Figure 4:
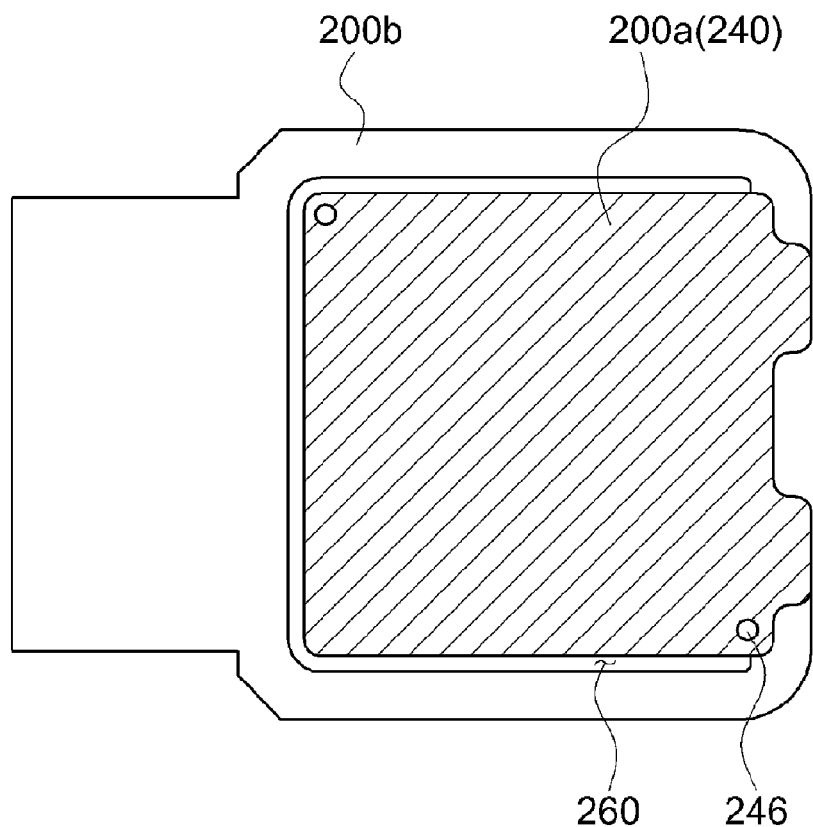
FIG. 4 is a development view showing a configuration example of the flexible circuit board.
Figure 5:
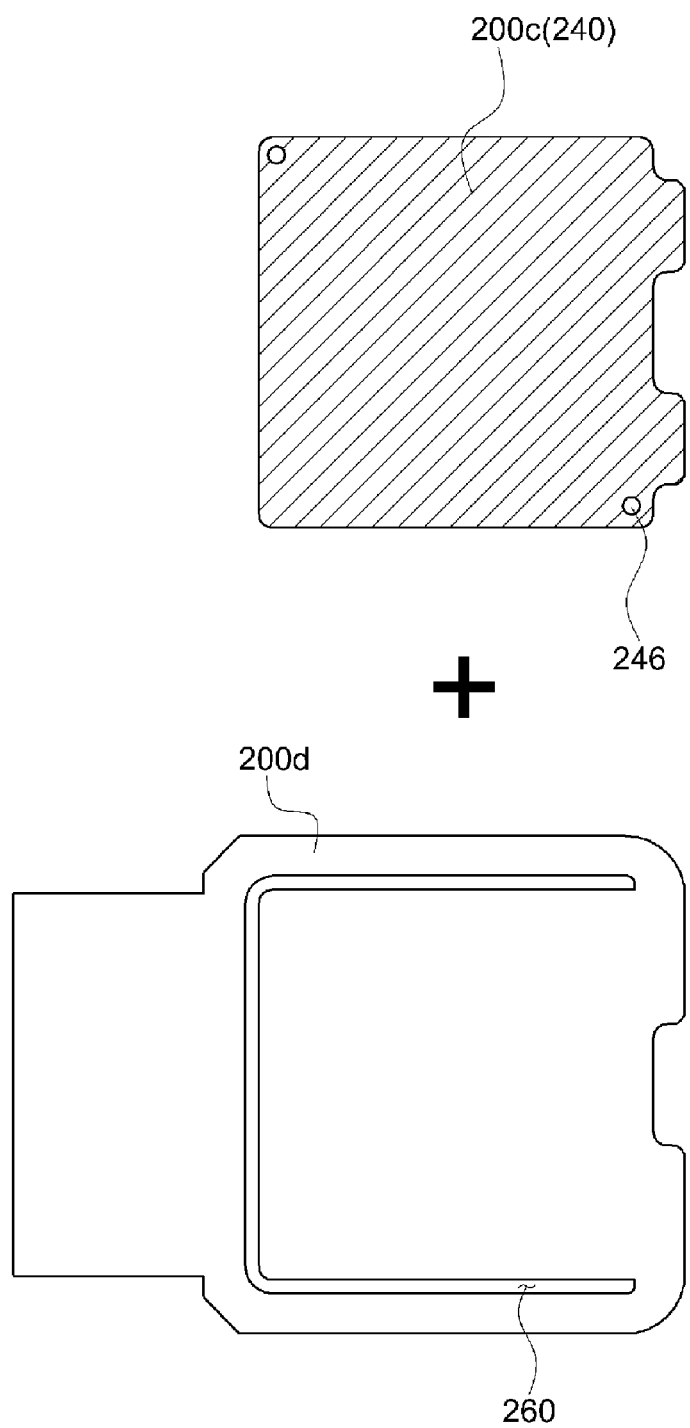
FIG. 5 is a development view showing another configuration example of the flexible circuit board.

FIGS. 4 and 5 show structural examples of the flexible circuit board 200 in the present invention. In the flexible circuit board 200, the connecting portion 240 necessarily has rigidity so as to be connected to the AF module 160 using the ACF, hot bar or SMT method, and the other components necessarily have softness so as to minimize that the other components have influence on the elasticity of the actuator.

FIG. 4 shows an example in which the flexible circuit board 200 is formed as a rigid-flexible PCB (RFPCB). In the example of FIG. 4, the RFPCB refers to a board obtained by combining a rigid PCB and a flexible PCB. In the example of FIG. 4, the region in which the connecting portion 240 of the flexible circuit board 200 is formed forms a rigid PCB 200a, and the region in which the other components including the extending portion, the mounting portion, etc. are formed forms a flexible PCB 200b.

Referring to FIG. 4, the cut-away portion 260 formed in the "⊔" shape as described above is formed between the rigid PCB 200a and the flexible PCB 200b. An aligning hole 246 may be formed at an edge portion of the rigid PCB 200a so as to align the rigid PCB 200a on the bottom of the AF module 160.

FIG. 5 shows an example in which the flexible circuit board 200 is configured by stacking two sheets of substrates.

As shown in this figure, the region in which the connecting portion 240 is formed forms a rigid PCB 200c. In the example of FIG. 5, an aligning hole 246 may also be formed at an edge portion of the rigid PCB 200c.

A flexible PCB 200d is attached to the rigid PCB 200c as shown in FIG. 5. The flexible PCB 200d includes other components including the extending portion, the mounting portion, etc., which are components except the connecting portion 240. In the flexible PCB 200d, a region corresponding to the rigid PCB 200d is additionally formed so as to apply an electrical signal to the rigid PCB 200d, and the additional may be formed to partially form the rigid PCB 200d.

Although the present invention has been explained by the embodiments shown in the drawings described above, it should be understood to the ordinary skilled person in the art that the present invention is not limited to the embodiments but rather that various changes or modifications thereof are possible without departing from the spirit of the present invention. Accordingly, the scope of the present invention shall be determined only by the appended claims and their equivalents.

INDUSTRIAL APPLICABILITY

The present invention relates to a camera module in which an optical image stabilizer (OIS) module is built using a module tilt method, so that the entire apparatus can be slimmed.

The invention claimed is:

1. A camera module comprising:
a lens unit;
an auto focusing (AF) module configured to move the lens unit in the direction of an optical axis;
an optical image stabilizer (OIS) module configured to be mounted around a circumference of the AF module and move the AF module in a horizontal direction;
a case configured to accommodate the lens unit, the AF module and the OIS module; and
a flexible circuit board configured to be connected to a bottom surface of the AF module and apply an electrical signal to the AF module, wherein the flexible circuit board comprises a mounting portion mounted on a bottom surface of the case, a cut-away portion, a connecting portion extended to an inside of the case from one side of the mounting portion so as to be connected to the AF module, and an extending portion extended to an outside of the case from the other side of the mounting portion.

2. The camera module of claim 1, wherein the cut-away portion is cut away along the circumference of the AF module in an inside of the mounting portion.

3. The camera module of claim 1, wherein a bump pad is formed in the AF module, and a connection pad connected to the bump pad is patterned in the connecting portion.

4. The camera module of claim 3, wherein a circuit pattern connected to the connection pad is formed to branch off to mounting portions respectively positioned at both sides of the connecting portion.

5. The camera module of claim 1, wherein a first coupling projection is formed on a sidewall of the case contacted by the extending portion of the flexible circuit board, and a first coupling hole having the first coupling projection inserted thereinto is formed in the extending portion.

6. The camera module of claim 1, wherein a second coupling projection is formed at one bottom side of the case, and a second coupling hole having the second coupling projection inserted thereinto is formed in one of the mounting portions of the flexible circuit board, which is adjacent to the extending portion.

7. The camera module of claim 1, wherein the cut-away portion is formed in a " ㄴ " shape.

8. The camera module of claim 1, wherein a guide projection is formed on the circumference of the AF module, and a guide groove accommodating the guide projection is formed in the inside of the case so as to control the horizontal movement of the AF module.

9. The camera module of claim 1, wherein the flexible circuit board is formed as a rigid-flexible PCB (RFPCB).

10. The camera module of claim 1, wherein the connecting portion of the flexible circuit board is formed with a rigid PCB, and the other components of the flexible circuit board are formed with a flexible PCB.

11. The camera module of claim 10, wherein an aligning hole is formed in an edge portion of the rigid PCB.

12. The camera module of claim 1, wherein the flexible circuit board has a structure in which the rigid PCB forming the connecting portion and the flexible PCB electrically connected to the rigid PCB and having the other components of the flexible circuit board are attached to each other.

13. The camera module of claim 1, wherein a bending portion is formed at one side of the extending portion, and the bending portion is assembled to an outer wall of the case.

14. The camera module of claim 1, wherein the OIS module comprises a housing accommodating the AF module, a coil unit mounted to an outside of the housing, a magnet unit formed in an inside of the housing, and an actuator elastically moving the AF module in the horizontal direction.

15. The camera module of claim 14, wherein a mounting projection is formed on an outer wall of the housing for accommodating the coil unit.

16. The camera module of claim 14, wherein the actuator is a spring elastically supporting the circumference of the AF module.

17. The camera module of claim 14, wherein the actuator performs an operation of allowing the AF module to be shaken by an electromagnetic force generated by the coil unit and the magnet unit.

18. The camera module of claim 1, wherein a guide projection is formed on the circumference of the AF module, and a guide groove accommodating the guide projection is formed in the inside of the case so as to control the horizontal movement of the AF module.

19. The camera module of claim 1, wherein an image sensor is mounted to the bottom surface of the AF module.

20. The camera module of claim 19, wherein the image sensor is a charged coupled device (CCD) or complementary metal oxide semiconductor (CMOS) sensor.

* * * * *